(12) United States Patent
Valdez-Campbell

(10) Patent No.: US 8,602,553 B1
(45) Date of Patent: Dec. 10, 2013

(54) APPARATUS TO SECURE EYEWEAR ON USER

(76) Inventor: Marilyn Rita Valdez-Campbell, Loveland, CO (US)

(*) Notice: Subject to any disclaimer, the term of this patent is extended or adjusted under 35 U.S.C. 154(b) by 63 days.

(21) Appl. No.: 13/317,681

(22) Filed: Oct. 25, 2011

Related U.S. Application Data

(60) Provisional application No. 61/406,383, filed on Oct. 25, 2010.

(51) Int. Cl.
*G02C 3/02* (2006.01)
*G02C 3/00* (2006.01)

(52) U.S. Cl.
CPC . *G02C 3/003* (2013.01); *G02C 3/02* (2013.01)
USPC .......................................................... 351/156

(58) Field of Classification Search
CPC ................................ G02C 3/0003; G02C 3/02
USPC ................................................. 351/155, 156
See application file for complete search history.

(56) References Cited

U.S. PATENT DOCUMENTS

| | | | |
|---|---|---|---|
| 2,700,158 A * | 1/1955 | Larsen | 2/8.1 |
| 2,704,961 A | 3/1958 | Weil | |
| 3,397,026 A | 8/1968 | Spina | |
| 3,917,387 A * | 11/1975 | Ensing | 351/123 |
| 4,133,604 A | 1/1979 | Fuller | |
| 4,515,449 A | 5/1985 | Davidson | |
| 4,541,696 A | 9/1985 | Winger et al. | |
| 4,743,105 A | 5/1988 | Tabacchi | |
| 4,783,164 A | 11/1988 | Heiberger | |
| 4,955,710 A | 9/1990 | Meistrell | |
| 5,507,075 A | 4/1996 | Tillstrom | |
| 6,449,777 B1 | 9/2002 | Montague | |
| 6,547,388 B1 | 4/2003 | Bohn | |
| 6,709,100 B2 | 3/2004 | Kalbach | |
| 2008/0316422 A1 | 12/2008 | Pettingill | |

FOREIGN PATENT DOCUMENTS

JP        2002156612 A  *  5/2002

* cited by examiner

*Primary Examiner* — Darryl J Collins
(74) *Attorney, Agent, or Firm* — James K. Poole, Esq.

(57) ABSTRACT

Apparatus comprising securing straps which attach to the temples of the eyewear such as eyeglasses and go over the top of the head and under the chin to secure the eyeglasses in place on a user.

10 Claims, 4 Drawing Sheets

APPARATUS TO SECURE EYEWEAR ON USER

This application claims priority from my provisional application U.S. Ser. No. 61/406,383, filed on Oct. 25, 2010 for "APPARATUS TO HOLD GLASSES ON TODDLERS AND PERSONS WITH DISABILITIES."

BACKGROUND

1. Field of the Invention

The present invention relates to an apparatus to hold eyewear on children, toddlers, and persons with disabilities.

2. Description of Relevant Art

Children or persons with disabilities sometimes have the need for eyewear, and depending on the age or disability, they don't know the eyewear will help. This is also a frustration for the parents or care givers. There is currently a retaining strap that goes behind the head to secure eyewear on the head as disclosed in U.S. Pat. No. 6,709,100. There are also retaining straps that go behind the head and over the top of the head, but do not include a strap under the chin, as disclosed in U.S. Pat. No. 6,449,774B1. Children will either push the eyewear up off their head or pull it down off their head. People with disabilities may have uncontrolled movements and keeping eyewear in place can be challenging. To secure eyewear easily and quickly is necessary when the child is struggling while the parent or care giver is trying to place the eyewear on their head.

SUMMARY

These devices or embodiments can be useful for wearers having various disabilities such as Autism, Down Syndrome, Dystonia-Cervical, Bradykinesia, and Persons with disabilities, such as Cerebral Palsy, Parkinson's, Gran Mal Seizures, Huntington's Disease, Sydenham's Chorea, and late stages of Multiple Sclerosis and Muscular Dystrophy.

Certain embodiments comprise two straps, one configured to be removably attached to the temples (includes the portions which attach to the endpieces of the frames and the earpieces) of a pair of eyeglasses or other eyewear and being long enough to pass over the top of the wearer's head, with the other similarly configured to be attached to the temples and long enough to pass under the wearer's chin to form a chin strap. The application of both straps to a pair of eyeglasses worn by an individual who has difficulty keeping glasses in position will gently but firmly maintain the glasses in place. The straps can be attached to the temples by means of loops in their ends, which can be formed by sewing the ends to adjacent portions of the straps, or by fastening the ends to corresponding portions in a removable fashion by employing suitable connecting devices. The chin strap can be passed either in front of or behind the ears, as most suitable for different wearers. The straps can be produced in lengths suitable for children and adults with various head sizes, and/or provided with optional length adjustment devices such as buckles or the like. While the use of top and chin straps of suitable lengths which are adjusted to suit the wearer will normally retain the glasses in position effectively, a typical strap or retaining device which removably fastens to the temples and passes behind the head of the wearer can optionally be used in addition. Placing the eyewear using the top strap and chin strap can be accomplished in one motion. As a toddler learns that the eyewear actually helps, the top strap or the chin strap can be removed one at a time and easily reinstalled as required.

The top and chin straps can be provided as a set or kit for installation and use by the wearer, or can optionally be provided with pairs of eyeglasses, sunglasses, goggles and other eyewear. The vendor, optometrist or other provider of eyewear can provide, adjust and install the top straps and chin strips to fit the individual as a service.

BRIEF DESCRIPTION OF DRAWINGS

Preferred embodiments of the invention, its objects and advantages will be further understood by perusal of the following drawings, detailed description and the appended claims.

DETAILED DESCRIPTION OF PREFERRED EMBODIMENTS

Figure 1:
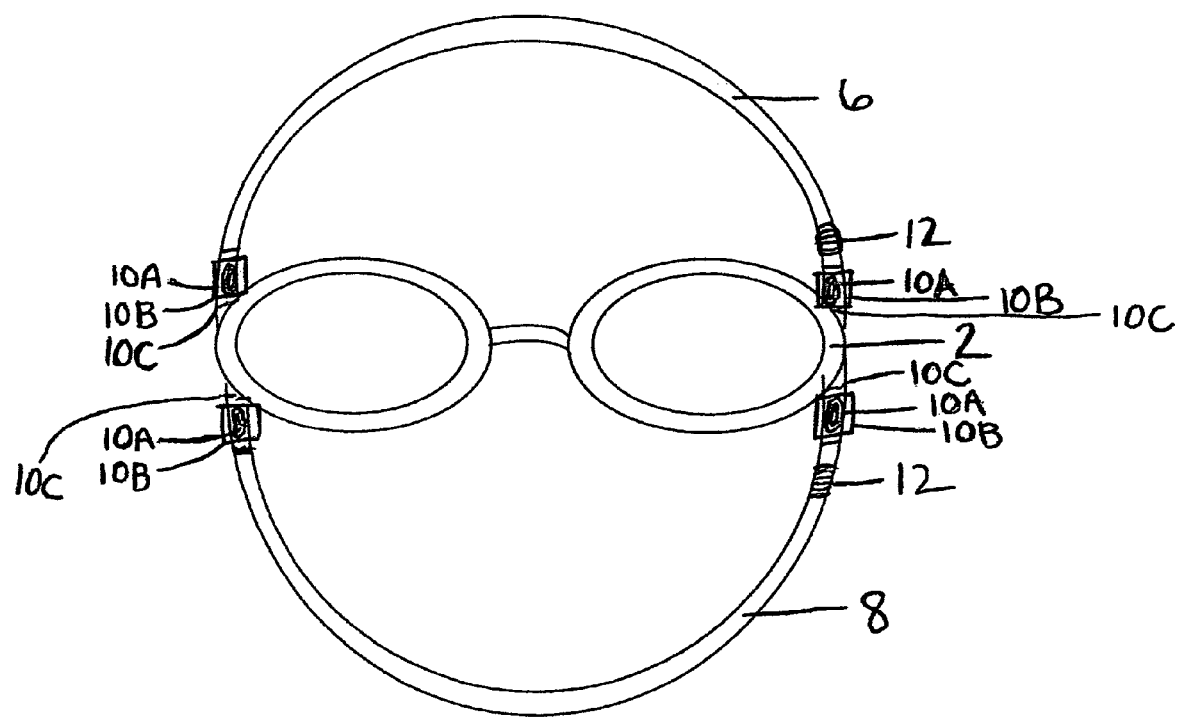
FIG. 1 is a front view of the apparatus with the components arranged as though securing a pair of eyeglasses on a user's head.
Figure 2:
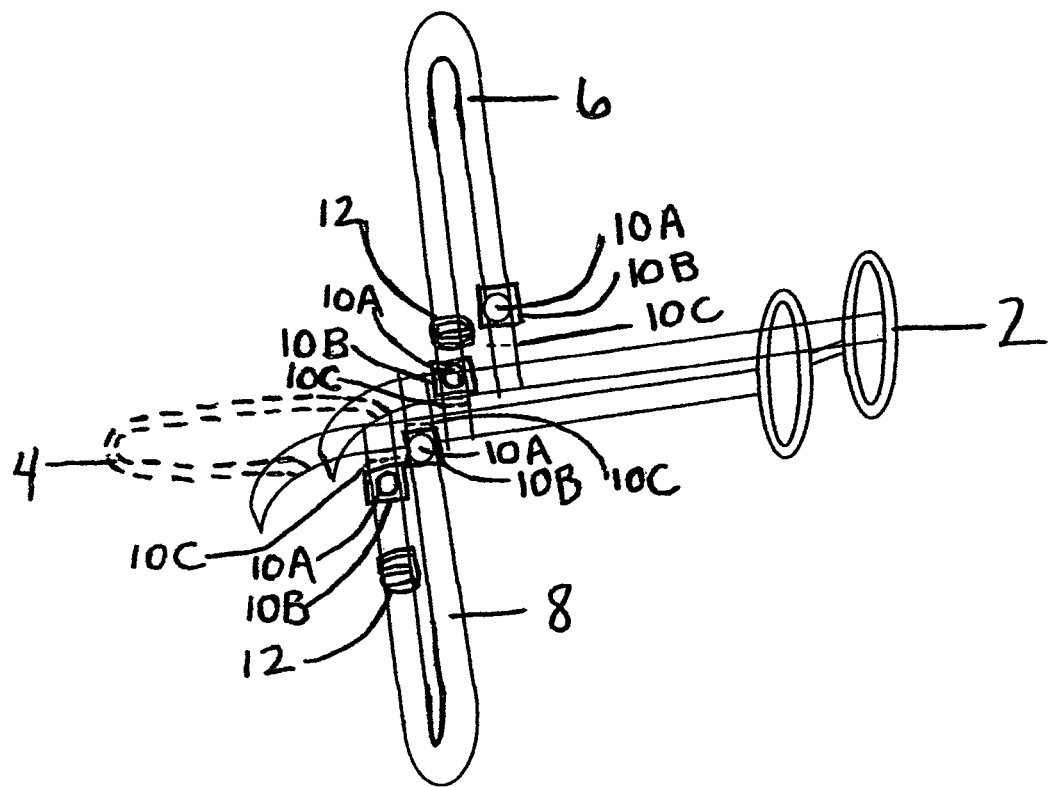
FIG. 2 is a side perspective view of the apparatus of FIG. 1

In the following detailed description, corresponding components in the various views of the figures bear the same identifying numerals. The description assumes a terrestrial frame of reference, in which "down" or lower is in the direction of the force of gravity and "up" or upper is in the opposite direction, and the wearer of the apparatus is assumed to be in an upright posture, having a head with front, back and right and left side areas, plus right and left ears. The term "and/or" is used in the conventional sense, in which "A and/or B" means that A, B or both A and B may be present.

As shown in FIGS. 1-4, eyeglasses 2 are designed to help improve a person's vision and or protect a person's vision from uncontrolled flying objects or UV rays. Eyeglasses are positioned on the face 1, across the bridge 3 of the nose 5, with temples 7 on the outer edge 9 on each side which goes over and/or wraps around or behind each ear 11.

Figure 3:
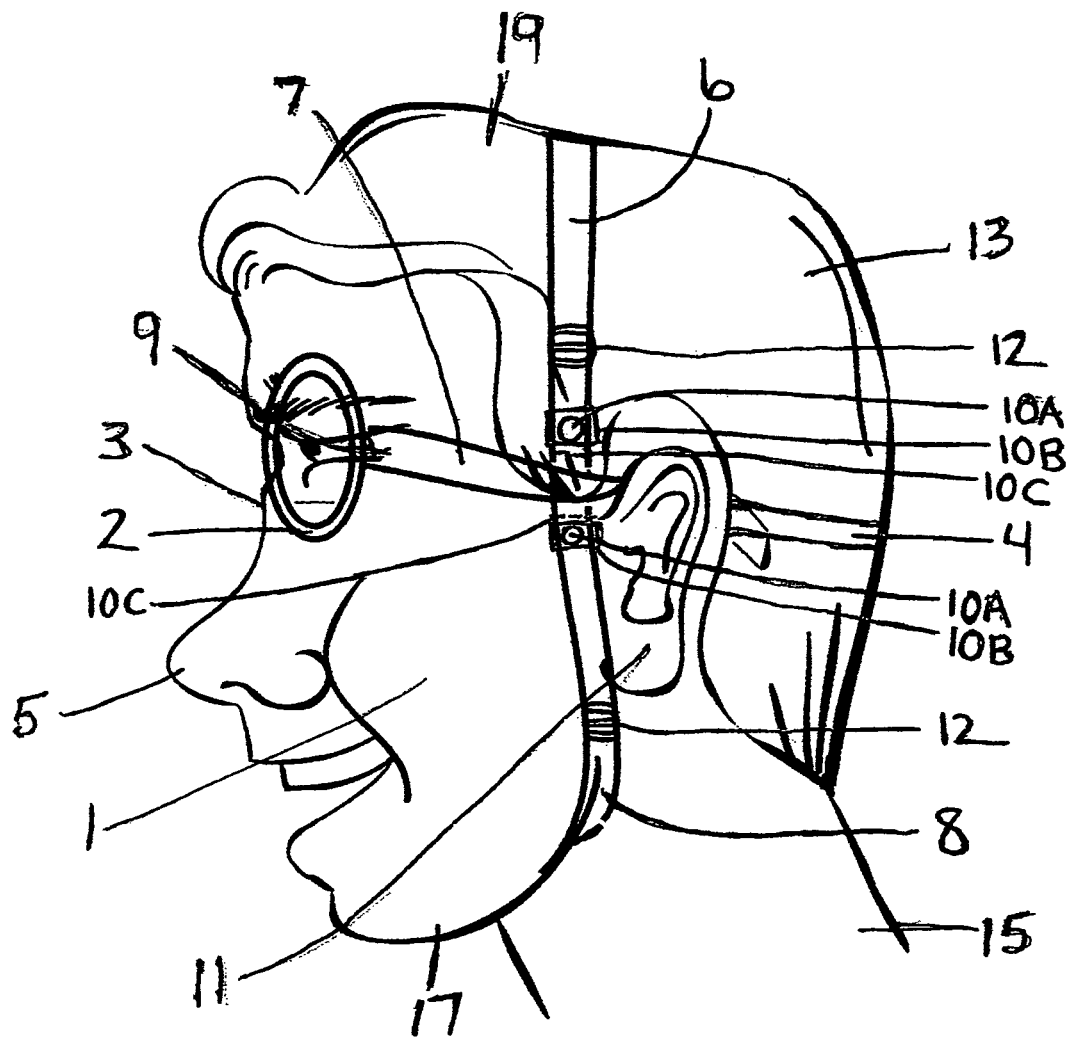
FIG. 3 is a side view of a person wearing a pair of eyeglasses secured by the apparatus of FIG. 1.
Figure 4:
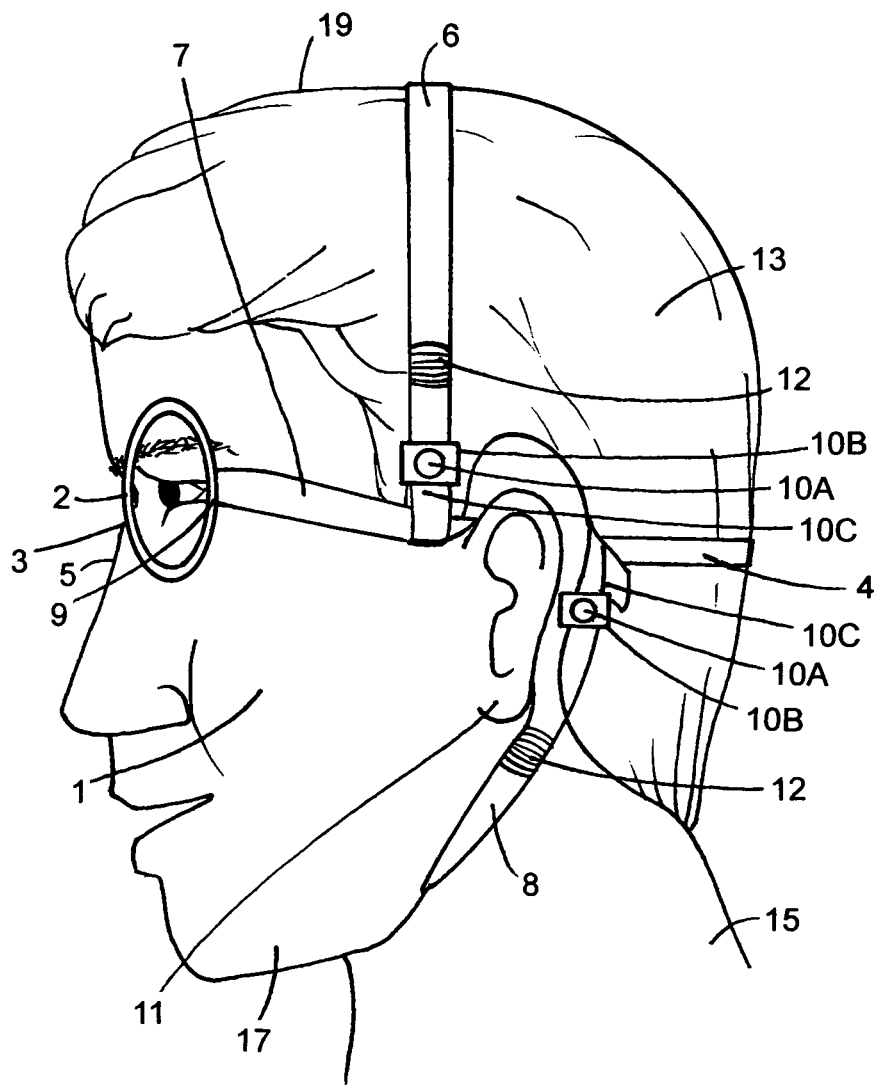
FIG. 4 is a side view of the person of FIG. 3 wearing the same eyeglasses secured by the apparatus, with the bottom strap passing behind the ears.

Some eyeglasses come with a retaining strap 4, shown in FIGS. 3 and 4 which attaches to the temples 7 and wraps behind the head 13 or neck 15 to prevent loss.

The top strap 6, which is positioned to sit on the top of the wearer's head, can be made of elastic, flexible vinyl, fabric, ribbon, or any known strapping material, and attaches on each temple 7 with a loop 10C created by sewing together or attaching and connecting 10A to 10B, which can be snaps, buttons, hook and loop fabric combination or other known connecting devices. The straps can be any desired color, including flesh color.

The bottom strap 8, which is positioned to sit under the wearer's chin 17, can also be made of elastic, flexible vinyl, fabric, ribbon, or known strapping material, and attaches on each temple 7 with a loop 10C created by sewing together or attaching and connecting 10A to 10B.

Each strap can be made adjustable in length with the use of an optional adjustment device 12, such as a buckle or slide made of plastic, metal or any known material for this function.

Necessary elements of the apparatus comprise the top strap 6, the bottom strap 8, and the connecting loop 10C created by sewing together or attaching and connecting 10A to 10B.

Optional elements comprise adjustment device 12 for adjusting strap lengths.

The top strap 6, which is positioned to sit on the top of the wearer's head 19, can be made of elastic, flexible vinyl, fabric, ribbon, or any known strapping material, and attaches on each temple 7 with a loop 10C created by sewing together or attaching and connecting 10A to 10B, which can be snaps, buttons, hook and loop fabric combination or other known connecting devices. The straps can be any desired color, including flesh color.

The bottom strap 8, which is positioned to sit under the wearer's chin, can be made of elastic, flexible vinyl, fabric, ribbon, or known strapping material, and attaches on each temple of eyeglasses 2 with a loop 10C created by sewing together or attaching and connecting 10A to 10B.

Each strap can be made adjustable with use of an optional adjustment device 12 such as a buckle or slide made of plastic, metal or any known material for this function.

The top strap 6, which is positioned to sit on the top of the wearer's head 19, is connected by wrapping around each temple 7 of the eyeglasses, and is attached to itself with the use of sewing, snaps buttons, hook and loop fabric combinations, or any known material for this function. A loop is created by wrapping around the temples 7 of the eyeglasses 2, and is preferably positioned to sit slightly in front of the ears 11.

The bottom strap 8, which is positioned to sit under the user's chin, is connected by wrapping around each temple 7 of the eyeglasses and is attached to itself with the use of sewing, snaps, buttons, hook and loop, or any known material for this function. Loops are created by wrapping around the temples 7 of the eyeglasses 2, and strap 8 is preferably positioned to sit slightly behind the ears 11.

The eyeglasses 2 are placed on the head 1 with the top strap 6 and bottom strap 8 attached and in position.

Each strap can then be adjusted to fit securely in place with use of an optional adjustment device 12.

The fabric/strap is cut to fit from ear 11 to ear 11, going over the top of the head 19 to make the top strap 6. A second strap is cut, to go from ear 11 to ear 11 under the chin 17 to form the bottom strap 8. The optional adjustment device 12 can be added to each strap. Connecting loops 10C are created by sewing, adding snaps, buttons, hook and loop fabric combinations such as Velcro® or any other known connecting device 10A and 10B. The straps are placed on the temples 7 of eyeglass 2.

The optional adjustment device can be positioned at any location on the straps.

The top strap 6 connecting loop 10C can be slid over the back of each temple 7 of eyeglass 2 if sewn. The top strap 6 can also be attached to the temple 7 of eyeglass 2 by wrapping around the temple 7 and creating the connecting loop 10C by using the connecting device 10A and 10B. The bottom strap 8 connecting loop 10C can slide over the back of each eyeglass 2 temple 7 if sewn. The bottom strap 8 can also be attached to the temples 7 of eyeglass 2 by wrapping around the temple 7 to create the connecting loop 10C by using the connecting devices 10A and 10B. The eyeglasses 2 are placed on the head 1 and the bottom strap 8 is positioned behind the ear 11 and the top strap 6 is positioned in front of the ear 11. Each strap can be adjusted with the optional strap adjustment device 12.

Each strap can be made adjustable in length with use of an optional adjustment device 12 made of plastic, metal or any known material for this function.

There are additional straps 4 that connect to the temples 7, of eyeglasses 2 which go around the back of the head 13, but do not secure the eyeglasses 2 from being pushed up or pulled down.

Strap 4 attaches to each of the temples 7 of eyeglasses 2 and is positioned around the back of the head or on the neck. This does not prevent the eyeglasses 2 from being pushed up or pulled down. Top straps 6 and bottom strap 8 will prevent the eyeglasses 2 from being pushed up or pulled down.

I claim:

1. A kit or set of at least two retaining straps specially adapted for use to secure eyewear in position on a wearer, comprising a first strap comprising a loop in each end for attachment to the temples of said eyewear, said temples comprising portions which attach to the endpieces of the eyewear frames and earpieces, or connecting devices for forming such loops and being long enough to pass over the top of the wearer's head when removably attached to said temples and a second strap also comprising loops at each end or connecting devices to form same, being long enough to pass under the chin of the wearer when removably attached to said temples, further comprising a third strap adapted to fasten to the ends of said temples and at least long enough to pass around the back of the wearer's head when said eyewear is positioned by said first strap and said second strap.

2. The kit or set of claim 1, wherein at least one of said retaining straps further comprises adjustment devices to adjust their length.

3. The kit or set of claim 2, wherein said adjustment devices include at least one buckle.

4. The kit or set of claim 1 wherein said connecting devices are selected from the group consisting of snaps, buttons and hook-and-loop fabric combinations.

5. The kit or set of claim 1 wherein said first and said second straps are formed of materials selected from the group consisting of elastic materials, fabrics, ribbons and plastics.

6. The kit or set of claim 5 wherein at least one of said straps is flesh-colored.

7. The kit or set of claim 1, further comprising eyewear for which said first strap, said second strap and said third strap are all adapted to secure said eyewear on a user's head.

8. The kit or set of claim 1 wherein said eyewear comprise eyeglasses having two lenses at least partially enclosed by frames.

9. A kit or set of at least two retaining straps specially adapted for use to secure eyewear having two lenses at least partially enclosed in eyeglass frames in position on a wearer, comprising a first strap comprising a loop in each end for attachment to the temples of said eyewear, said temples comprising portions which attach to the endpieces of the eyeglass frames and earpieces, or connecting devices for forming such loops, and being long enough to pass over the top of the wearer's head when removably attached to said temples, a second strap also comprising loops at each end or connecting devices to form same, being long enough to pass under the chin of the wearer when removably attached to said temples, and further comprising a third strap adapted to fasten to the ends of said temples and at least long enough to pass around the back of the wearer's head when said eyewear is positioned by said first strap and said second strap, and wherein at least one of said straps comprises a flexible vinyl plastic material.

10. The kit or set of claim 9 wherein at least one of said retaining straps includes an adjustment device to adjust the strap length, said device including a buckle.

* * * * *